(12) United States Patent
Hu et al.

(10) Patent No.: US 10,977,449 B2
(45) Date of Patent: Apr. 13, 2021

(54) LANGUAGE PROCESSING USING A NEURAL NETWORK

(71) Applicant: Advanced New Technologies Co., Ltd., George Town (KY)

(72) Inventors: Xiang Hu, Hangzhou (CN); Zujie Wen, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/818,898

(22) Filed: Mar. 13, 2020

(65) Prior Publication Data
US 2021/0049327 A1 Feb. 18, 2021

Related U.S. Application Data

(63) Continuation of application No. PCT/CN2020/072057, filed on Jan. 14, 2020.

(30) Foreign Application Priority Data

Aug. 15, 2019 (CN) .......................... 201910754677.7

(51) Int. Cl.
*G10L 15/16* (2006.01)
*G06F 40/30* (2020.01)
(Continued)

(52) U.S. Cl.
CPC .............. *G06F 40/30* (2020.01); *G06N 3/08* (2013.01); *G06N 3/084* (2013.01); *G10L 15/063* (2013.01); *G10L 15/16* (2013.01)

(58) Field of Classification Search
CPC ...... G06N 3/088; G06N 3/084; G06K 9/6814; G10L 15/16; G10L 15/063
See application file for complete search history.

(56) References Cited

U.S. PATENT DOCUMENTS 10,679,124 B1 * 6/2020 Corrado .................. G06F 7/483
2017/0132514 A1 * 5/2017 Krizhevsky .......... G06N 3/0454
(Continued)

FOREIGN PATENT DOCUMENTS

CN 109740123 5/2019
CN 110059323 7/2019
(Continued)

OTHER PUBLICATIONS

A. Vaswani, et al., "Attention Is All You Need," NIPS Proceedings, 31st Conference on Neural Information Processing Systems, 2017. (Year: 2017).*
(Continued)

*Primary Examiner* — Feng-Tzer Tzeng
(74) *Attorney, Agent, or Firm* — Fish & Richardson P.C.

(57) ABSTRACT

This disclosure relates to language processing using a neural network. In one aspect, a method includes performing, at an embedding layer of a neural network, embedding processing on a current input to obtain feature vectors. The neural network includes at least one transformer layer that includes a first transformer layer including an attention layer and a pooling layer. A quantity P of input vectors are obtained at the attention layer. P intermediate vectors are determined based on the input vectors. For each input vector of the P input vectors, a respective intermediate vector is obtained using the corresponding input vector as a center and based on correlation values calculated between the input vector and each other input vector in a predetermined attention window range. The P intermediate vectors are combined to form a quantity Q of output vectors. Output vectors are generated as a feature representation of the current input.

18 Claims, 5 Drawing Sheets

(51) Int. Cl.
*G06N 3/08* (2006.01)
*G10L 15/06* (2013.01)

(56) References Cited

U.S. PATENT DOCUMENTS

| | | | | |
|---|---|---|---|---|
| 2017/0169315 | A1* | 6/2017 | Vaca Castano | G06K 9/6814 |
| 2017/0213381 | A1* | 7/2017 | Bronstein | G06K 9/6244 |
| 2017/0308790 | A1* | 10/2017 | Nogueira dos Santos | |
| | | | | G06N 3/0454 |
| 2019/0122111 | A1* | 4/2019 | Min | G06N 3/0481 |
| 2019/0130273 | A1 | 5/2019 | Keskar et al. | |

FOREIGN PATENT DOCUMENTS

| | | | |
|---|---|---|---|
| CN | 1100426244 | 7/2019 | |
| CN | 110083826 | 8/2019 | |
| CN | 110555099 | 12/2019 | |
| WO | WO-2017136784 A1 * | 8/2017 | G06N 3/0472 |

OTHER PUBLICATIONS

Chen, et al., "A convolutional neural network with dynamic correlation pooling," 13th International Conference on Computational Intelligence and Security, 2017. (Year: 2017).*

Vaswani, et al., NIPS Proceedings, 2017—31st Conference on Neural Information Processing Systems; Title: Attention Is All You Need. (Year: 2017).*

Chen, et al., 2017 13th International Conference on Computational Intelligence and Security; Title: A convolutional neural network with dynamic correlation pooling. (Year: 2017).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Baidu.com [online], "BERT fire but don't understand Transformer? It's enough to read this one," Jan. 2019, retrieved on Jun. 1, 2020, retrieved from URL<https://baijiahao.baidu.com/s?id=1622064575970777188&wfr=spider&for=pc>, 42 pages (with machine translation).

csdn.net [online], "Graphical Transformer (full version)," Jan. 2019, retrieved on Jun. 1, 2020, retrieved from URL<https://blog.csdn.net/longxinchen_ml/article/details/86533005>, 51 pages (with machine translation).

Horev, lyrn.ai [online], "Transformer-XL—Combining Transformers and RNNs Into a State-of-the-art Language Model," Jan. 2019, retrieved on Jun. 1, 2020, retrieved from URL<https://www.lyrn.ai/2019/01/16/transformer-xl-sota-language-model/>, 5 pages.

International Search Report and Written Opinion in International Application No. PCT/CN2020/072057, dated May 14, 2020, 19 pages (with machine translation).

Vaswani et al., "Attention Is All You Need," 31st Conference on Neural Information Processing Systems, Dec. 2017, pp. 1-15.

* cited by examiner

LANGUAGE PROCESSING USING A NEURAL NETWORK

CROSS-REFERENCE TO RELATED APPLICATIONS

This application is a continuation of PCT Application No. PCT/CN2020/072057, filed on Jan. 14, 2020, which claims priority to Chinese Patent Application No. 201910754677.7, filed on Aug. 15, 2019, and each application is hereby incorporated by reference in its entirety.

TECHNICAL FIELD

One or more implementations of the present specification relate to the field of computer information processing, and in particular, to language processing using a neural network.

BACKGROUND

In a plurality of application scenarios of artificial intelligence, natural language processing tasks such as semantic analysis, intent recognition, and intelligent translation need to be completed. Natural language processing is based on accurate description of an objective language. For example, a sentence is represented as a sentence feature vector, so that the sentence is subsequently analyzed and processed based on the sentence feature vector.

A typical application of artificial intelligence natural language processing is a customer service robot. A core capability of an online customer service robot is to determine text similarity to match a user problem and a standard problem in a knowledge base, so that a standard problem having highest similarity with the user problem can be matched from the knowledge base, and therefore, an answer of the standard problem can be used to answer the user problem. Therefore, improving accuracy of the language to reflect the objective facts, and improving speed of generation of the description are important for accurately answering a user problem in time.

SUMMARY

One or more implementations of the present specification describe computer-executed methods for language processing by using a neural network, to reduce computational complexity and enlarge a field of view of a self-attention window.

According to a first aspect, a computer-executed method for language processing by using a neural network is provided. The neural network includes an embedding layer and at least one transformer layer, the at least one transformer layer includes a first transformer layer, and the first transformer layer includes an attention layer and a pooling layer. The method includes: performing embedding processing on current input at the embedding layer to obtain a plurality of feature vectors; obtaining, at the attention layer, P input vectors from an upper layer of the first transformer layer; and obtaining, by using any first input vector in the P input vectors as a center, an intermediate vector corresponding to the first input vector based on a correlation between each input vector in a predetermined attention window range and the first input vector, to determine P intermediate vectors corresponding to the P input vectors; and combining the P intermediate vectors at the pooling layer to form Q output vectors, where Q<P, where a plurality of output vectors obtained at a last transformer layer in the at least one transformer layer are used as a feature representation of the current input.

In an implementation, the first transformer layer is a lower layer of the embedding layer; and the obtaining P input vectors from an upper layer of the first transformer layer includes: obtaining the plurality of feature vectors from the embedding layer as the P input vectors.

In an implementation, the at least one transformer layer further includes a second transformer layer, and the second transformer layer is an upper layer of the first transformer layer; and the obtaining P input vectors from an upper layer of the first transformer layer includes: obtaining output vectors of the second transformer layer from the second transformer layer as the P input vectors.

In an implementation, the at least one transformer layer is N transformer layers, and the first transformer layer is an $n^{th}$ transformer layer in the N transformer layers; and Q in the Q output vectors is determined based on a quantity of feature vectors in the plurality of feature vectors, a value of a coverage radius of an attention window, N, and n, where Q is negatively correlated with n.

In an implementation, Q is determined in the following method: determining a first difference between the quantity of feature vectors in the plurality of feature vectors and the value of the coverage radius; determining a first proportion of n to N; determining a value of a first product of the first difference and the first proportion; and determining Q based on the quantity of feature vectors in the plurality of feature vectors and the value of the first product.

In an implementation, a difference between Q and P is a predetermined fixed value.

In an implementation, the intermediate vector is a vector with H dimensions; and the combining the P intermediate vectors to form Q output vectors includes: fixing a sequence of the P intermediate vectors, selecting Q relatively large values from P values of the P intermediate vectors in any of the H dimensions, and forming a value sequence in the dimension based on the sequence; and forming the Q output vectors based on an H×Q matrix formed by sequentially arranging value sequences in all of the H dimensions.

In an implementation, the combining the P intermediate vectors to form Q output vectors includes: determining a module of each of the P intermediate vectors; and fixing a sequence of the P intermediate vectors, selecting Q modules with a relatively large value from modules of the P intermediate vectors, and forming the Q output vectors in the sequence.

In an implementation, the embedding layer includes an input embedding layer and a positional encoding layer; and the performing embedding processing on current input to obtain a plurality of feature vectors includes: performing word embedding processing on a plurality of words in the current input at the input embedding layer, to obtain a plurality of word embedding vectors; and generating, at the positional encoding layer, a position vector of each of the plurality of words based on a position of the word in the current input, and combining the position vector of each word with a corresponding word embedding vector to obtain the plurality of feature vectors.

According to a second aspect, a language processing apparatus is provided, including an embedding unit and at least one attention unit. The at least one attention unit includes a first transformer unit and a determining unit, and the first transformer unit includes a first obtaining subunit and a first combination subunit.

The embedding unit is configured to perform embedding processing on current input to obtain a plurality of feature vectors.

The first obtaining subunit is configured to: obtain P input vectors from an upper unit of the first transformer unit; and obtain, by using any first input vector in the P input vectors as a center, an intermediate vector corresponding to the first input vector based on a correlation between each input vector in a predetermined attention window range and the first input vector, to determine P intermediate vectors corresponding to the P input vectors.

The first combination subunit is configured to combine the P intermediate vectors to form Q output vectors, where Q<P.

A plurality of output vectors obtained at a last transformer unit in the at least one transformer unit are used as a feature representation of the current input.

According to a third aspect, a computer readable storage medium is provided. The computer readable storage medium stores a computer program, and when the computer program is executed in a computer, the computer performs the method according to the first aspect.

According to a fourth aspect, a calculation terminal is provided, including a memory and a processor. The memory stores executable code, and when executing the executable code, the processor implements the method according to the first aspect.

According to the method and the apparatus provided in the implementations of the present specification, a self-attention window is introduced to reduce computational complexity. In addition, when there are a plurality of transformer layers, a quantity of input vectors of each transformer layer can be decreased layer by layer, thereby enlarging a field of view of the self-attention window, and solving a problem that a long-range dependency feature cannot be captured after the self-attention window is introduced.

BRIEF DESCRIPTION OF DRAWINGS

To describe the technical solutions in the implementations of the present disclosure more clearly, the following briefly describes the accompanying drawings needed for describing the implementations. Clearly, the accompanying drawings in the following description show merely some implementations of the present disclosure, and a person of ordinary skill in the art can still derive other drawings from these accompanying drawings without creative efforts.

DESCRIPTION OF IMPLEMENTATIONS

The following describes the solutions provided in the present specification with reference to the accompanying drawings.

Description of an objective language fact is essential for natural language processing (NLP) tasks such as text similarity, text classification, reading comprehension, machine translation, etc. The objective language fact can be described by using a language model. The language model is a simple, unified, and abstract form system, and the objective language fact described by the language model is suitable for automatic processing of a computer.

In one solution, text data can be processed using bidirectional encoder representations from transformers (BERT). The BERT is a multi-layer bidirectional transformer network structure, and runs a self-monitoring learning method based on a large quantity of corpuses to obtain a feature representation used to describe the objective language fact. Although the feature representation obtained by using the BERT greatly improves accuracy of a natural language processing task, self-monitoring is performed at each layer, and consequently, overall complexity is $O(n^2)$, and a large quantity of machine resources are required.

In another solution, text data can be processed using transformer-xl. The transformer-xl is also a multi-layer transformer network structure, and implements long-range dependency by fixing an attention window and passing a hidden state. In this solution, a large attention window is needed, for example, a coverage radius is 160 words, to obtain a relatively accurate feature representation. However, a larger attention window also causes relatively high overall complexity, and needs a large quantity of machine resources.

The implementations of the present specification provide a computer-executed method for language processing using a neural network. The method can be applied to a neural network having a plurality of transformer layers. At each transformer layer, input vectors can be obtained from an upper layer of the transformer layer; the input vectors are processed based on a self-attention window to obtain intermediate vectors; the intermediate vectors are combined to obtain a relatively small quantity of output vectors, and the output vectors are used as input vectors of a lower layer of the transformer layer. By analogy, a quantity of vectors that need to be processed can be decreased layer by layer, a field of view of the self-attention window can be enlarged, and accuracy of a calculation result is ensured while computational complexity is reduced.

Figure 1:
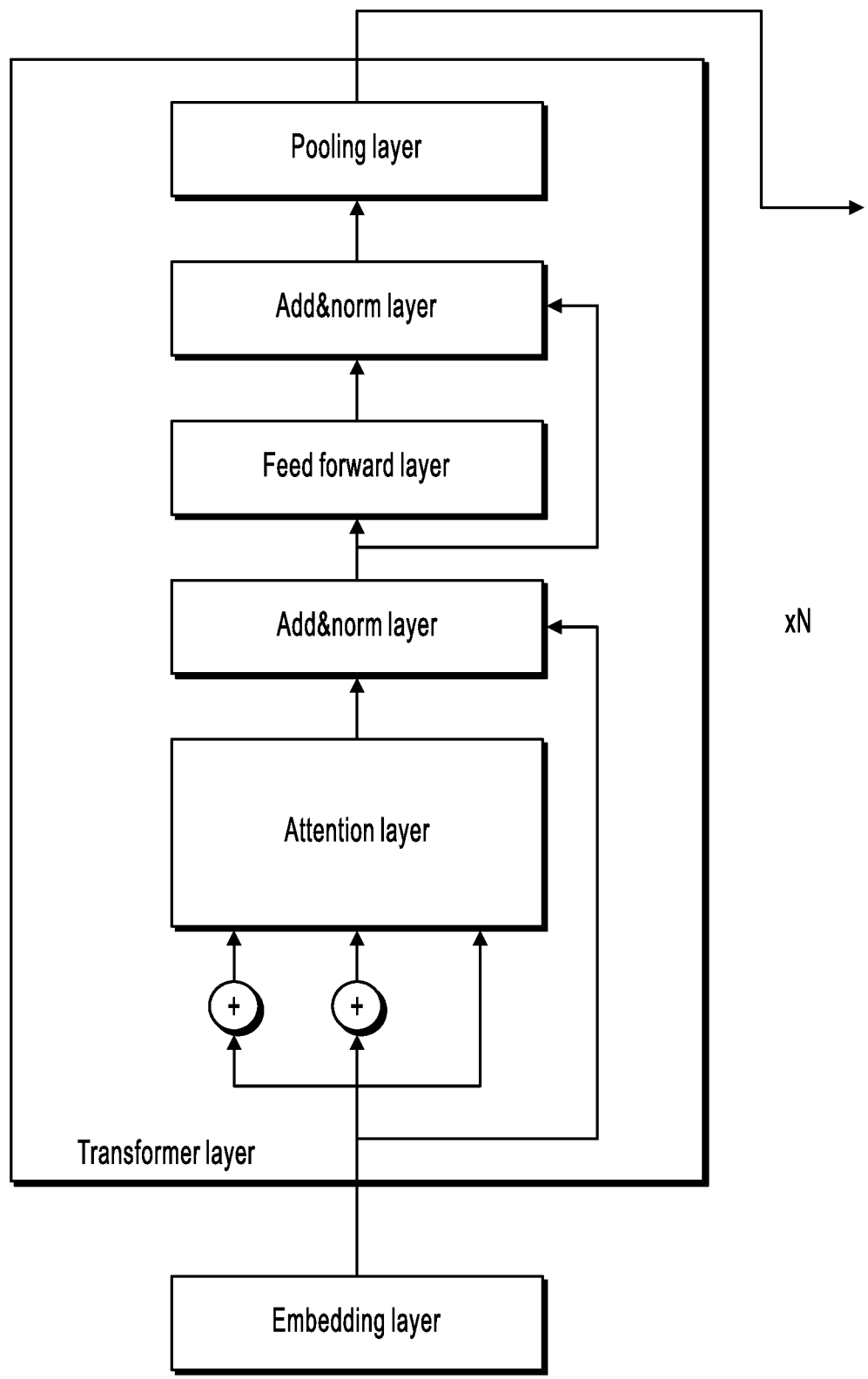
FIG. 1 is a schematic structural diagram illustrating a neural network model, according to an implementation.
Figure 2:
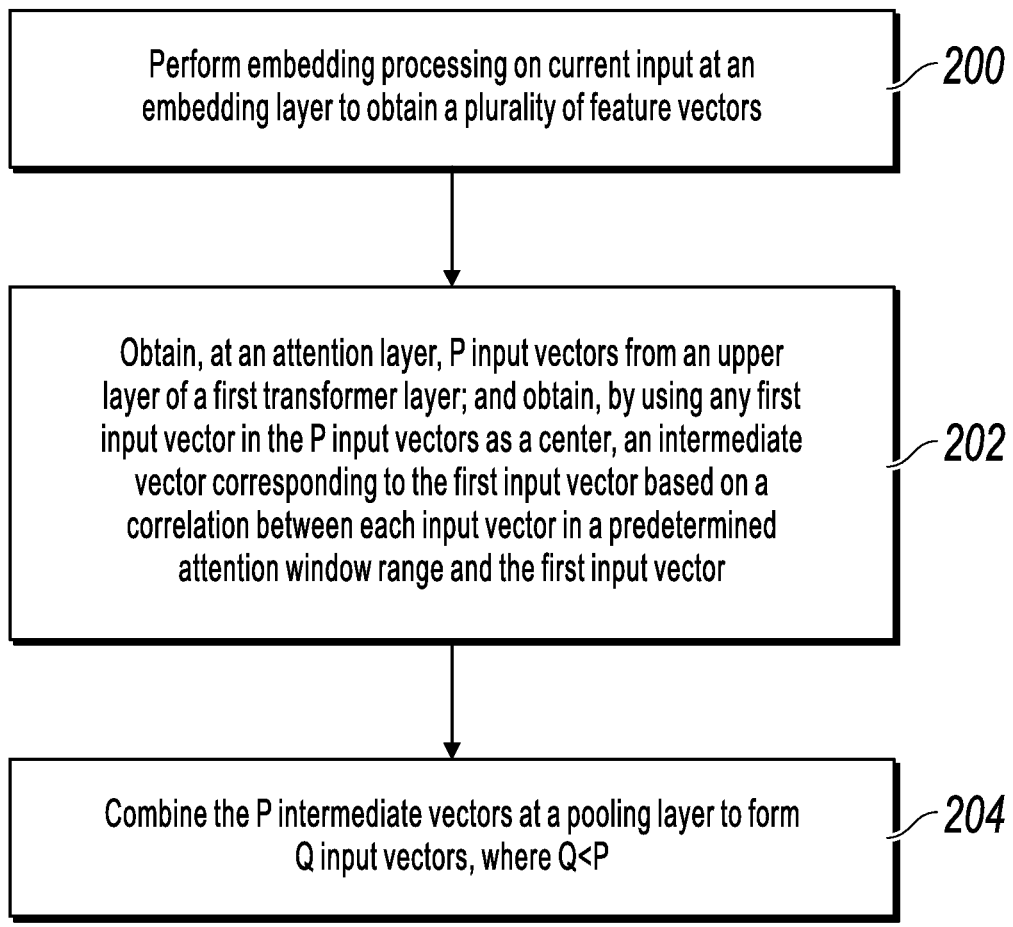
FIG. 2 is a flowchart illustrating a language processing method, according to an implementation.

A computer-executed method for language processing by using a neural network provided in an implementation of the present specification is specifically described below with reference to FIG. 1 and FIG. 2. As shown in FIG. 1, the neural network includes an embedding layer and at least one transformer layer, and the at least one transformer layer may be N transformer layers (N is an integer greater than 0). Each transformer layer includes an attention layer, an add&norm layer, a feed forward layer, an add&norm layer, and a pooling (pooling) layer that are sequentially adjacent to each other.

Next, the language processing method provided in this implementation of the present specification is described by using any first transformer layer included in the at least one transformer layer as an example. The method can be performed by any apparatus, device, platform, or device cluster having computing and processing capabilities. As shown in FIG. 2, the method includes the following steps: Step 200: Perform embedding processing on current input at the embedding layer to obtain a plurality of feature vectors. Step 202: Obtain, at the attention layer, P input vectors from an upper layer of the first transformer layer; and obtain, by using any first input vector in the P input vectors as a center, an intermediate vector corresponding to the first input vector based on a correlation between each input vector in a predetermined attention window range and the first input vector, to determine P intermediate vectors corresponding to the P input vectors. Step 204: Combine the P intermediate vectors at the pooling layer to form Q output vectors, where Q<P, and a plurality of output vectors obtained at a last transformer layer in the at least one transformer layer are used as a feature representation of the current input.

The previous steps are specifically described below with reference to a specific example.

First, in step 200, embedding processing is performed on the current input at the embedding layer to obtain the plurality of feature vectors.

The embedding layer can be referred to as an input embedding (input embedding) layer. The current input can be text input, for example, can be a segment of text or a sentence. The text can be a Chinese text, an English text, or a text in another language.

After the current input is obtained at the embedding layer, embedding processing can be performed on each word in the current input to obtain a feature vector of the word.

In some implementations, as shown in FIG. 1, the embedding layer includes an input embedding layer and a positional encoding (positional encoding) layer.

Word embedding processing can be performed on each word in the current input at the input embedding layer, to obtain a word embedding vector of the word.

A position of each word in the current input can be obtained at the positional encoding layer, and then a position vector is generated for the position of the word.

In some examples, the position of each word can be an absolute position of the word in the current input. An example that the current input is "Which date should pay Ant Credit Pay" is used. A position of "which" can be represented as the first digit, and a position of "date" can be represented as the second digit . . . .

In some examples, the position of each word can be a relative position between words. An example that the current input is "Which date should pay Ant Credit Pay" is still used. A position of "which" can be represented as that "which" is before "date", and a position of "date" can be represented as that "date" is after "which" and before "should" . . . .

When the word embedding vector and the position vector of each word in the current input are obtained, the position vector and the corresponding word embedding vector of each word can be combined to obtain each word feature vector, that is, obtain the plurality of feature vectors corresponding to the current input.

The plurality of feature vectors can be represented as an embedding matrix with a predetermined dimension. A quantity of feature vectors in the plurality of feature vectors can be set to M, and the predetermined dimension can be set to H. In this case, the plurality of feature vectors can be represented as an M×H embedding matrix.

Then is step 202, at the attention layer of the first transformer layer, the P input vectors are obtained from the upper layer of the first transformer layer; and by using any first input vector in the P input vectors as the center, the intermediate vector corresponding to the first input vector is obtained based on the correlation between each input vector in the predetermined attention window range and the first input vector, to determine the P intermediate vectors corresponding to the P input vectors.

The attention layer can also be referred to as a multi-head attention (multi-head attention) layer. In an example, the attention layer can be a fixed window multi-head attention (fixed window multi-head attention) layer.

In some implementations, the first transformer layer can be a lower layer of the embedding layer, and the P input vectors are the plurality of feature vectors obtained at the embedding layer.

In some implementations, the at least one transformer layer in the neural network provided in this implementation of the present specification further includes a second transformer layer. The second transformer layer is an upper layer of the first transformer layer, and the P input vectors are P output vectors output from the second transformer layer.

Figure 3:
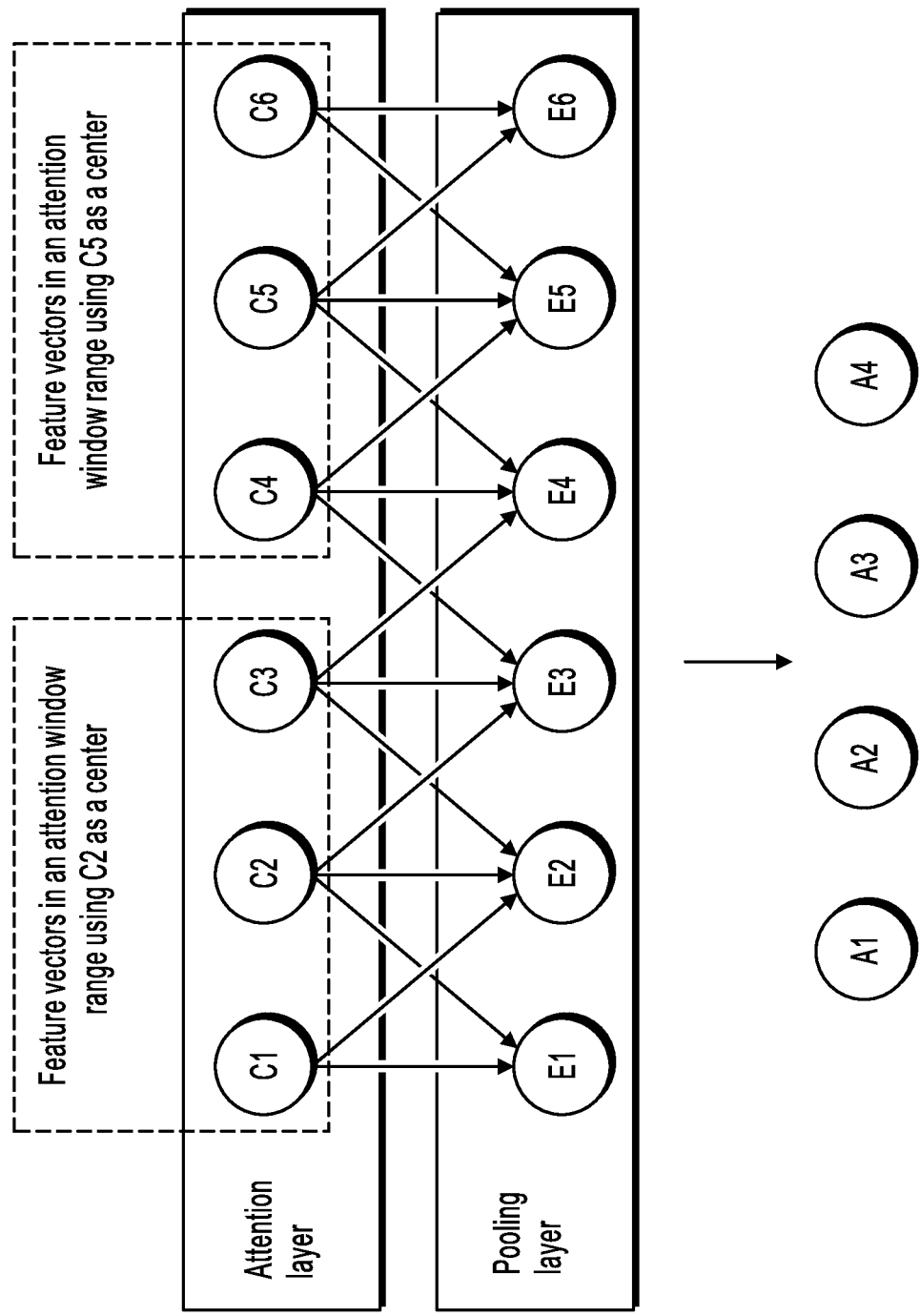
FIG. 3 is a schematic diagram illustrating intermediate vector calculation, according to an implementation.

In this implementation of the present specification, the attention window range can be represented by a coverage radius of an attention window, and the coverage radius can be represented by a quantity of covered vectors. The coverage radius can be set to w, and w can be a fixed value or a variable value. When w is a variable value and the at least one transformer layer includes a plurality of transformer layers, w can be changed layer by layer based on a predetermined rule. When an intermediate vector of any first input vector is calculated, the input vector is used as a center and input vectors in the predetermined attention window range are used as w input vectors before the first input vector and w input vectors after the first input vector. In an example, referring to FIG. 3, it is set that input vectors C1, C2, C3, C4, C5, and C6 are obtained at the attention layer. A sequence of the six input vectors can be shown in FIG. 3. The coverage radius w of the attention window can be set to 1. Referring to FIG. 3, an example that an intermediate vector E2 corresponding to C2 is calculated is used. Feature vectors in an attention window range using C2 as a center are C1 and C3. Therefore, the intermediate vector E2 can be calculated based on a correlation between C2 and C1 and a correlation between C2 and C3. Referring to FIG. 3, an example that an intermediate vector E5 corresponding to C5 is calculated is used. Feature vectors in an attention window range using C5 as a center are C4 and C6. Therefore, the intermediate vector E5 can be calculated based on a correlation between C5 and C4 and a correlation between C5 and C6.

In some implementations, at the attention layer, for any input vector Cp in the P input vectors, a correlation $A_{p,i}$ between Cp and any input vector Ci in a predetermined attention window range using Cp as a center can be calculated by using an equation (1):

$$A_{p,i} = UC_p \cdot KC_i \qquad (1),$$

where p represents a position of the input vector Cp in the P input vectors; i represents a position of the input vector Ci in the P input vectors, where a value of i is between p+w and p−w; and both U and K are linear transformation matrices.

To simplify description, $u_p$ can be used to represent $UC_p$, and $k_i$ can be used to represent $KC_i$.

In this implementation, a weight factor between Cp and Ci can be specifically calculated by using an equation (2) based on the correlation $A_{p,i}$:

$$a_{p,i} = \frac{u_p \cdot k_i}{\sum_{j=p-w}^{p+w} u_p \cdot k_i}, \qquad (2)$$

where
j represents a position of an input vector Cj in the P input vectors.

In some implementations, $A_{p,i}$ can be further represented as $\exp(u_p \cdot k_i)$. Correspondingly, the weight factor $a_{p,i}$ of Cp corresponding to Ci can be specifically calculated by using an equation (3):

$$a_{p,i} = \frac{\exp(u_p \cdot k_i)}{\sum_{j=p-w}^{p+w} \exp(u_p \cdot k_i)} \quad (3)$$

Then an intermediate vector Ep corresponding to Cp can be calculated based on a weight factor between Cp and each input vector corresponding to Cp. In some implementations, Ep can be calculated by using an equation (4):

$$E_p = \sum_{i=p-w}^{p+w} a_{p,i} \cdot VC_i, \quad (4)$$

where
V is a linear transformation matrix.

As such, the P intermediate vectors corresponding to the P input vectors can be obtained.

Next, in step 204, the P intermediate vectors are combined at the pooling layer to form the Q output vectors of the first transformer layer, where Q<P.

In some implementations, Q can be determined based on a predetermined difference, that is, Q is obtained by subtracting the predetermined difference from P. The predetermined difference can be set based on an experiment or experience.

In some implementations, the at least one transformer layer in the neural network provided in this implementation of the present specification is specifically N transformer layers. N is a natural number greater than or equal to 2. Q is negatively correlated with a quantity of transformer layers above the first transformer layer, that is, a larger quantity of transformer layers above the first transformer layer indicates a smaller Q.

In an example of these implementations, Q can be calculated based on N, P, w, and a quantity M of feature vectors output from the embedding layer, and can be specifically calculated by using an equation (5):

$$Q = P - \frac{M - w}{N} \quad (5)$$

In an example of these implementations, it may be set that the first transformer layer is an $n^{th}$ transformer layer in the N transformer layers (there are (n−1) transformer layers above the first transformer layer), and Q can be calculated based on N, n, w, and M. Specifically, a first difference between M and w can be determined, a first proportion of n to N is then determined, a value of a first product of the first difference and the first proportion is determine, and Q is then determined based on M and the value of the first product. In an example, Q can be calculated by using an equation (6):

$$Q = M - \frac{(M-w)n}{N} \quad (6)$$

In another example, Q can be calculated by using an equation (7):

$$Q = M - k\frac{(M-w)n}{N}, \quad (7)$$

where
K>0.

Figure 4:
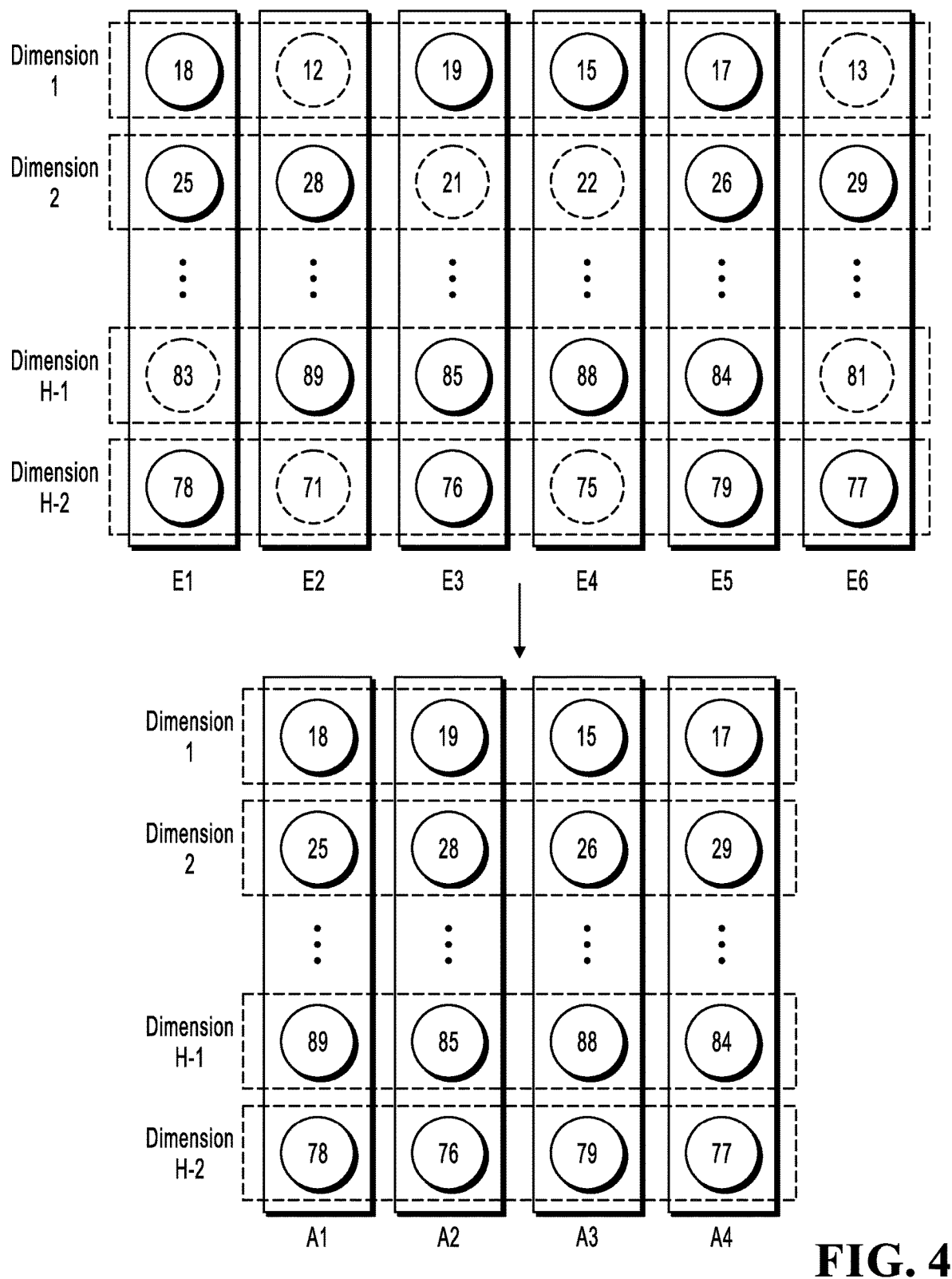
FIG. 4 is a schematic diagram illustrating vector combination, according to an implementation.

In some implementations, the intermediate vector can be a vector with H dimensions, and the P intermediate vectors can be represented as a P×H embedding matrix. For details, reference can be made to FIG. 4. Each row represents a dimension, and each column represents an input vector. A sequence of elements in each row can be fixed. Specifically, a relative position relationship between the elements in each row can be fixed. When the P intermediate vectors are combined to form the Q vectors, Q relatively large values are determined from each row, that is, a minimum value in the determined Q relatively large values is greater than or equal to a first value. The first value is any value except the Q relatively large values in the same row. As such, Q relatively large values are respectively determined from H rows, namely, H dimensions. A relative position between the Q relatively large values in any row keeps unchanged. Q relatively large values in the H rows constitute a Q×H embedding matrix. The Q×H embedding matrix is a representation of the Q output vectors. For details, reference can be made to FIG. 4. Six intermediate vectors E1, E2, E3, E4, E5, and E6 are used as examples, and Q is set to 4. In a row corresponding to a dimension 1, four relatively large values are sequentially 18, 19, 15, and 17. In a row corresponding to a dimension 2, four relatively large values are sequentially 25, 28, 26, and 29. In a row corresponding to a dimension H−1, four relatively large values are sequentially 89, 85, 88, and 84. In a row corresponding to a dimension H, four relatively large values are 78, 76, 79, and 77. Relative positions of all of the relatively large values in each row remain unchanged, and four output vectors A1, A2, A3, and A4 can be obtained by combining the relatively large values.

In some implementations, a sequence of the P intermediate vectors can be fixed, and specifically, a relative position relationship between the P intermediate vectors can be fixed. Modules of the P intermediate vectors are calculated, and Q relatively large modules are then selected from the modules. As such, Q intermediate vectors respectively corresponding to the Q relatively large modules can be determined from the P intermediate vectors, and a relative position relationship between the Q intermediate vectors are kept unchanged to obtain the Q output vectors.

When the language processing method provided in this implementation of the present specification is applied to the neural network having a plurality of transformer layers, a quantity of input vectors of the transformer layer can be decreased layer by layer by using step 204, so that a field of view of a self-attention window is enlarged or expanded layer by layer. In an example, it may be set that the plurality of transformer layers are six transformer layers, the current input has 40 words, the attention window coverage range is four words, and nine input vectors are decreased layer by layer.

The first layer (uppermost layer) in the six transformer layers has 40 input vectors. Therefore, when an intermediate vector corresponding to one of the 40 input vectors is calculated, a field of view of the attention window that corresponds to the input vector is four of the 40 words.

A second layer in the six transformer layers has 31 input vectors. Therefore, when an intermediate vector corresponding to each input vector is calculated, a field of view of the attention window that corresponds to the input vector is four of the 31 words.

By analogy, a quantity of input vectors is decreased layer by layer, so that the field of view of the attention window enlarges layer by layer. In addition, relatively large values in each dimension of intermediate vectors obtained at each layer are selected and combined to form input vectors of a next layer, or intermediate vectors with a relatively large module are selected from the intermediate vectors obtained at each layer and are used as input vectors of a next layer, so that important feature information of the vector obtained through calculation at the current layer is retained while a quantity of input vectors of the next layer is decreased. Therefore, accuracy of a calculation result can be ensured by enlarging the field of view of the attention window and retaining the important feature information while computational complexity is reduced.

At a last transformer layer in the neural network, the plurality of output vectors in the above steps can be used as a feature representation of the current input. The feature representation is a feature representation of the current input that is suitable for computer processing and can be used for tasks such as text similarity, text classification, reading comprehension, machine translation, etc.

In the language processing method provided in this implementation of the present specification, a self-attention window is introduced to reduce computational complexity. In addition, when there are a plurality of transformer layers, a quantity of input vectors of each transformer layer can be decreased layer by layer, thereby enlarging a field of view of the self-attention window, and solving a problem that a long-range dependency feature cannot be captured after the self-attention window is introduced.

Figure 5:
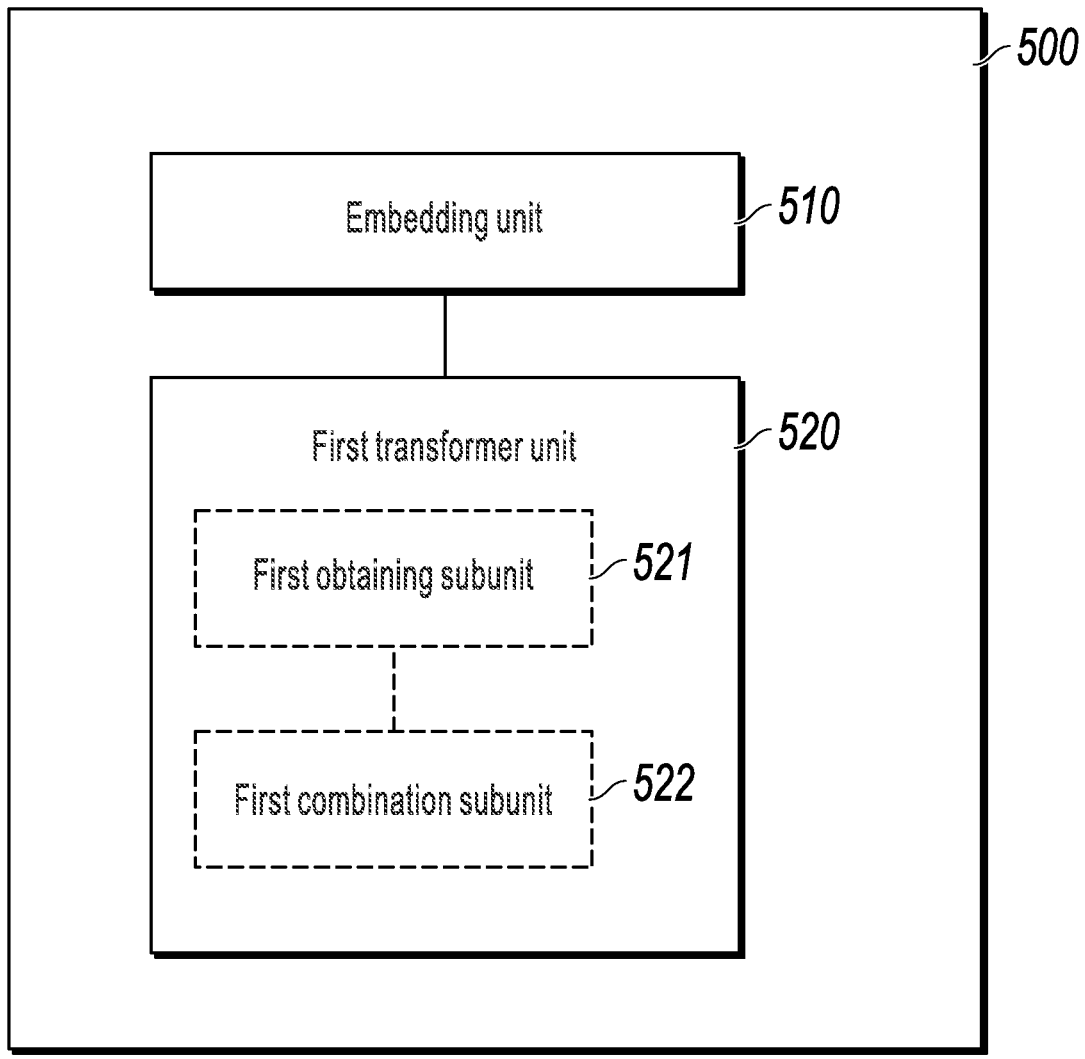
FIG. 5 is a schematic block diagram illustrating a language processing apparatus, according to an implementation.

According to a second aspect, an implementation of the present specification provides a language processing apparatus 500. Referring to FIG. 5, the apparatus 500 includes an embedding unit 510 and at least one transformer unit, the at least one transformer unit includes a first transformer unit 520, and the first transformer unit includes a first obtaining subunit 521 and a first combination subunit 522.

The embedding unit 510 is configured to perform embedding processing on current input to obtain a plurality of feature vectors.

The first obtaining subunit 521 is configured to obtain P input vectors from an upper unit of the first transformer unit 520; and obtain, by using any first input vector in the P input vectors as a center, an intermediate vector corresponding to the first input vector based on a correlation between each input vector in a predetermined attention window range and the first input vector, to determine P intermediate vectors corresponding to the P input vectors.

The first combination subunit 522 is configured to combine the P intermediate vectors to form Q output vectors, where Q<P.

A plurality of output vectors obtained at a last transformer unit in the at least one transformer unit are used as a feature representation of the current input.

In an implementation, the embedding unit 520 is connected to the first obtaining subunit 521, and the first obtaining subunit 521 is further configured to obtain the plurality of feature vectors from the embedding unit 520 as the P input vectors.

In an implementation, the at least one transformer unit further includes a second transformer unit, and the second transformer unit is connected to the first obtaining subunit 521. The first obtaining subunit 521 is further configured to obtain output vectors of the second transformer unit from the second transformer unit as the P input vectors.

In an implementation, the at least one transformer unit is N transformer units, and the first transformer unit 520 is an $n^{th}$ transformer unit in the N transformer units. Q in the Q output vectors is determined based on a quantity of feature vectors in the plurality of feature vectors, a value of a coverage radius of an attention window, N, and n, where Q is negatively correlated with n.

In an implementation, the apparatus 500 further includes a first determining unit, a second determining unit, a third determining unit, and a fourth determining unit. The first determining unit is configured to determine a first difference between the quantity of feature vectors in the plurality of feature vectors and a value of the coverage radius, the second determining unit is configured to determine a first proportion of n to N, the third determining unit is configured to determine a value of a first product of the first difference and the first proportion, and the fourth determining unit is configured to determine Q based on the quantity of feature vectors in the plurality of feature vectors and the value of the first product.

In an implementation, a difference between Q and P is a predetermined fixed value.

In an implementation, the intermediate vector is a vector with H dimensions. The first combination subunit 522 includes a selection module and an arrangement module. The selection module is configured to: fix a sequence of the P intermediate vectors, select Q relatively large values from P values of the P intermediate vectors in any of the H dimensions, and form a value sequence in the dimension based on the sequence. The arrangement module is configured to form the Q output vectors based on an H×Q matrix formed by sequentially arranging value sequences in all of the H dimensions.

In an implementation, the first combination subunit 522 includes a determining module and a selection module. The determining module is configured to determine a module of each of the P intermediate vectors. The selection module is configured to: fix a sequence of the P intermediate vectors, select Q modules with a relatively large value from modules of the P intermediate vectors, and form the Q output vectors in the sequence.

In an implementation, the embedding unit 510 includes an input embedding subunit and a positional encoding subunit. The input embedding subunit is configured to perform word embedding processing on a plurality of words in the current input to obtain a plurality of word embedding vectors. The positional encoding subunit is configured to: generate a position vector of each of the plurality of words based on a position of the word in the current input, and combine the position vector of each word with a corresponding word embedding vector to obtain the plurality of feature vectors.

In the language processing apparatus provided in this implementation of the present specification, a self-attention window is introduced to reduce computational complexity. In addition, when there are a plurality of transformer layers, a quantity of input vectors of each transformer layer can be decreased layer by layer, thereby enlarging a field of view of the self-attention window, and solving a problem that a long-range dependency feature cannot be captured after the self-attention window is introduced.

According to another aspect, an implementation of the present specification provides a computer readable storage medium. The computer readable storage medium stores a computer program, and when the computer program is executed in a computer, the computer performs the method shown in FIG. 2.

According to another aspect, an implementation of the present specification provides a calculation terminal, including a memory and a processor. The memory stores executable code, and when executing the executable code, the processor implements the method shown in FIG. 2.

A person skilled in the art should be aware that in the previous one or more examples, functions described in the present disclosure can be implemented by hardware, software, firmware, or any combination thereof. When the present disclosure is implemented by software, the functions can be stored in a computer readable medium or transmitted as one or more instructions or code in the computer readable medium.

The objectives, technical solutions, and benefits of the present disclosure are further described in detail in the previous specific implementations. It should be understood that the previous descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method for language processing using a neural network, the method comprising:
   performing, at an embedding layer of a neural network, embedding processing on a current input to the embedding layer to obtain a plurality of feature vectors, wherein:
     the neural network comprises the embedding layer and N transformer layers, and
     the N transformer layers comprise a first transformer layer comprising an attention layer and a pooling layer, wherein the first transformer layer is an nth transformer layer in the N transformer layers;
   obtaining, at the attention layer of the first transformer layer, a quantity P of input vectors from an upper layer of the first transformer layer; and
   determining P intermediate vectors based on the P input vectors, including, for each input vector of the P input vectors:
     obtaining, using the input vector as a center, a respective intermediate vector based on correlation values calculated between the input vector and each other input vector in a predetermined attention window range,
   determining a quantity Q based on a quantity of feature vectors in the plurality of feature vectors, a value of a coverage radius of an attention window, N, and n, wherein the quantity Q is negatively correlated with n, and wherein determining the quantity Q comprises:
     determining a first difference between the quantity of feature vectors in the plurality of feature vectors and the value of the coverage radius;
     determining a first proportion of n to N;
     determining a value of a first product of the first difference and the first proportion; and
     determining the quantity Q based on the quantity of feature vectors in the plurality of feature vectors and the value of the first product;
   combining the P intermediate vectors at the pooling layer to form Q output vectors, wherein Q<P; and
   generating, as a feature representation of the current input, a plurality of output vectors obtained at a last transformer layer in the N transformer layers.

2. The computer-implemented method of claim 1, wherein:
   the first transformer layer is a lower layer of the embedding layer; and
   obtaining the P input vectors from the upper layer of the first transformer layer comprises:
     obtaining the plurality of feature vectors from the embedding layer as the P input vectors.

3. The computer-implemented method of claim 1, wherein:
   the N transformer layers further comprise a second transformer layer, and the second transformer layer is an upper layer of the first transformer layer; and
   obtaining the P input vectors from an upper layer of the first transformer layer comprises obtaining output vectors of the second transformer layer from the second transformer layer as the P input vectors.

4. The computer-implemented method of claim 1, wherein a difference between the quantity Q and the quantity P is a predetermined fixed value.

5. The computer-implemented method of claim 1, wherein each intermediate vector is a vector with a quantity H of dimensions; and
   the combining the P intermediate vectors to form Q output vectors comprises:
     fixing a sequence of the P intermediate vectors;
     selecting Q values from the quantity P of values of the P intermediate vectors in any of the H dimensions;
     forming a value sequence in each dimension of the H dimensions based on the sequence of the P intermediate vectors; and
     forming the Q output vectors based on an H×Q matrix formed by sequentially arranging value sequences in all of the H dimensions.

6. The computer-implemented method of claim 1, wherein:
   the embedding layer comprises an input embedding layer and a positional encoding layer; and
   performing embedding processing on the current input to the embedding layer to obtain the plurality of feature vectors comprises:
     performing word embedding processing on a plurality of words in the current input at the input embedding layer to obtain a plurality of word embedding vectors;
     generating, at the positional encoding layer, a position vector of each of the plurality of words based on a position of the word in the current input; and
     combining the position vector of each word with a word embedding vector corresponding to the word to obtain the plurality of feature vectors.

7. A non-transitory, computer-readable medium storing one or more instructions executable by a computer system to perform operations comprising:
   performing, at an embedding layer of a neural network, embedding processing on a current input to the embedding layer to obtain a plurality of feature vectors, wherein:
     the neural network comprises the embedding layer and N transformer layers, and
     the N transformer layers comprise a first transformer layer comprising an attention layer and a pooling layer, wherein the first transformer layer is an nth transformer layer in the N transformer layers;
   obtaining, at the attention layer of the first transformer layer, a quantity P of input vectors from an upper layer of the first transformer layer; and
   determining P intermediate vectors based on the P input vectors, including, for each input vector of the P input vectors:
     obtaining, using the input vector as a center, a respective intermediate vector based on correlation values calculated between the input vector and each other input vector in a predetermined attention window range, determining a quantity Q based on a quantity of feature vectors in the plurality of feature vectors, a value of a coverage radius of an attention window, N, and n, wherein the quantity Q is negatively correlated with n, and wherein determining the quantity Q comprises:
  determining a first difference between the quantity of feature vectors in the plurality of feature vectors and the value of the coverage radius;
  determining a first proportion of n to N;
  determining a value of a first product of the first difference and the first proportion; and
  determining the quantity Q based on the quantity of feature vectors in the plurality of feature vectors and the value of the first product;

combining the P intermediate vectors at the pooling layer to form Q output vectors, wherein Q<P; and generating, as a feature representation of the current input, a plurality of output vectors obtained at a last transformer layer in the N transformer layers.

8. The non-transitory, computer-readable medium of claim 7, wherein:
  the first transformer layer is a lower layer of the embedding layer; and
  obtaining the P input vectors from the upper layer of the first transformer layer comprises:
    obtaining the plurality of feature vectors from the embedding layer as the P input vectors.

9. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    performing, at an embedding layer of a neural network, embedding processing on a current input to the embedding layer to obtain a plurality of feature vectors, wherein:
      the neural network comprises the embedding layer and N transformer layers, and
      the N transformer layers comprise a first transformer layer comprising an attention layer and a pooling layer, wherein the first transformer layer is an nth transformer layer in the N transformer layers;
    obtaining, at the attention layer of the first transformer layer, a quantity P of input vectors from an upper layer of the first transformer layer; and
    determining P intermediate vectors based on the P input vectors, including, for each input vector of the P input vectors:
      obtaining, using the input vector as a center, a respective intermediate vector based on correlation values calculated between the input vector and each other input vector in a predetermined attention window range,
    determining a quantity Q based on a quantity of feature vectors in the plurality of feature vectors, a value of a coverage radius of an attention window, N, and n, wherein the quantity Q is negatively correlated with n, and wherein determining the quantity Q comprises:
      determining a first difference between the quantity of feature vectors in the plurality of feature vectors and the value of the coverage radius;
      determining a first proportion of n to N;
      determining a value of a first product of the first difference and the first proportion; and
      determining the quantity Q based on the quantity of feature vectors in the plurality of feature vectors and the value of the first product;
    combining the P intermediate vectors at the pooling layer to form Q output vectors, wherein Q<P; and
    generating, as a feature representation of the current input, a plurality of output vectors obtained at a last transformer layer in the N transformer layers.

10. The computer-implemented system of claim 9, wherein:
  the first transformer layer is a lower layer of the embedding layer; and
  obtaining the P input vectors from the upper layer of the first transformer layer comprises:
    obtaining the plurality of feature vectors from the embedding layer as the P input vectors.

11. The computer-implemented system of claim 9, wherein:
  the N transformer layers further comprise a second transformer layer, and the second transformer layer is an upper layer of the first transformer layer; and
  obtaining the P input vectors from an upper layer of the first transformer layer comprises obtaining output vectors of the second transformer layer from the second transformer layer as the P input vectors.

12. The computer-implemented system of claim 9, wherein a difference between the quantity Q and the quantity P is a predetermined fixed value.

13. The computer-implemented system of claim 9, wherein each intermediate vector is a vector with a quantity H of dimensions; and
  the combining the P intermediate vectors to form Q output vectors comprises:
    fixing a sequence of the P intermediate vectors;
    selecting Q values from the quantity P of values of the P intermediate vectors in any of the H dimensions;
    forming a value sequence in each dimension of the H dimensions based on the sequence of the P intermediate vectors; and
    forming the Q output vectors based on an H×Q matrix formed by sequentially arranging value sequences in all of the H dimensions.

14. The computer-implemented system of claim 9, wherein:
  the embedding layer comprises an input embedding layer and a positional encoding layer; and
  performing embedding processing on the current input to the embedding layer to obtain the plurality of feature vectors comprises:
    performing word embedding processing on a plurality of words in the current input at the input embedding layer to obtain a plurality of word embedding vectors;
    generating, at the positional encoding layer, a position vector of each of the plurality of words based on a position of the word in the current input; and
    combining the position vector of each word with a word embedding vector corresponding to the word to obtain the plurality of feature vectors.

15. The non-transitory, computer-readable medium of claim 7, wherein:

the N transformer layers further comprises a second transformer layer, and the second transformer layer is an upper layer of the first transformer layer; and obtaining the P input vectors from an upper layer of the first transformer layer comprises obtaining output vectors of the second transformer layer from the second transformer layer as the P input vectors.

16. The non-transitory, computer-readable medium of claim 7, wherein a difference between the quantity Q and the quantity P is a predetermined fixed value.

17. The non-transitory, computer-readable medium of claim 7, wherein each intermediate vector is a vector with a quantity H of dimensions; and the combining the P intermediate vectors to form Q output vectors comprises:
  fixing a sequence of the P intermediate vectors;
  selecting Q values from the quantity P of values of the P intermediate vectors in any of the H dimensions;
  forming a value sequence in each dimension of the H dimensions based on the sequence of the P intermediate vectors; and
  forming the Q output vectors based on an H×Q matrix formed by sequentially arranging value sequences in all of the H dimensions.

18. The non-transitory, computer-readable medium of claim 7, wherein:
  the embedding layer comprises an input embedding layer and a positional encoding layer; and
  performing embedding processing on the current input to the embedding layer to obtain the plurality of feature vectors comprises:
    performing word embedding processing on a plurality of words in the current input at the input embedding layer to obtain a plurality of word embedding vectors;
    generating, at the positional encoding layer, a position vector of each of the plurality of words based on a position of the word in the current input; and
    combining the position vector of each word with a word embedding vector corresponding to the word to obtain the plurality of feature vectors.

* * * * *